E. H. WIEGAND.
Process of Brewing.
No. 163,827. Patented May 25, 1875.
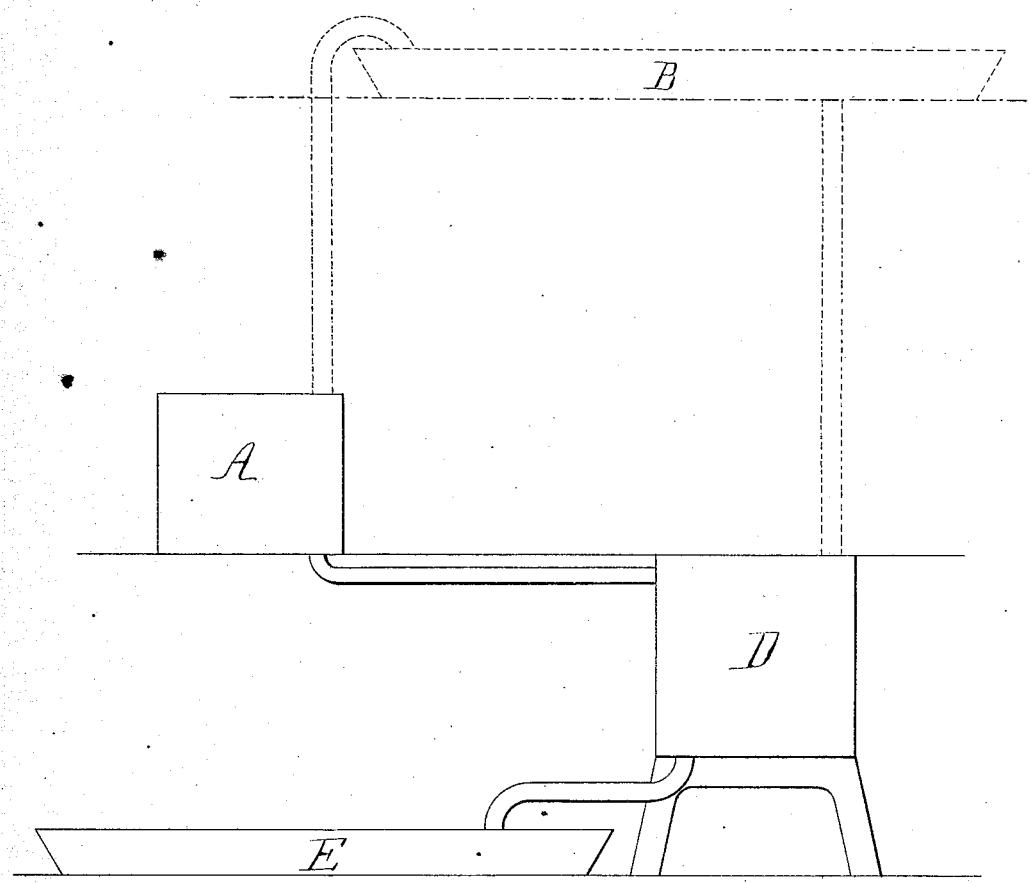

UNITED STATES PATENT OFFICE.

EMIL H. WIEGAND, OF PHILADELPHIA, PENNSYLVANIA, ASSIGNOR TO JOSEPH FIELEMEYER, OF SAME PLACE.

IMPROVEMENT IN PROCESSES OF BREWING.

Specification forming part of Letters Patent No. 163,827, dated May 25, 1875; application filed September 30, 1874.

*To all whom it may concern:*

Be it known that I, EMIL H. WIEGAND, of Philadelphia, Pennsylvania, have invented an Improved Process of Brewing, of which the following is a specification:

The object of my invention is to facilitate fermentation in the brewing of malt liquors, in the manner which I will now proceed to describe, reference being had to the diagram shown in the accompanying drawing.

In brewing malt liquor it is the usual practice to first boil the malt in water, which is afterward introduced into the boiler A, containing the hops, where it is again subjected to heat for a proper length of time, after which it is conveyed through suitable pipes to the pans B, as shown by dotted lines, which are usually located in the top story of the building, the liquid being allowed to remain in these pans until cool.

When perfectly cold, the liquid is conveyed to the vat D, in which, according to the usual process, the fermentation is allowed to take place; but it is well known that although the first stages of fermentation are comparatively rapid, the subsequent stages, owing to the contracted area of the vat, are much slower, from fifteen to twenty days being required to complete the process.

I have found that by allowing the first stages only of the process to be completed in the vat D, and then conveying the partly-fermented liquor to a shallow vessel, E, of large area, in which the process is completed, the fermentation is greatly facilitated.

Practical tests have determined the fact that while the liquor, if retained in the vat D, requires the above-mentioned time to be completely fermented, the fermentation can be accomplished by my process, and the liquor allowed to settle and clear itself in from four to five days.

I claim as my invention, and as an improvement in the art of brewing—

The process described of subjecting the liquor obtained directly from the hop-vat A to primary fermentation in a comparatively deep vessel, D, and then to final fermentation in a shallow vessel or vessels, E, as and for the purpose set forth.

In testimony whereof I have signed my name to this specification in the presence of two subscribing witnesses.

EMIL H. WIEGAND.

Witnesses:
HUBERT HOWSON,
HARRY SMITH.